(12) United States Patent
Linet et al.

(10) Patent No.: US 7,690,185 B2
(45) Date of Patent: Apr. 6, 2010

(54) SYSTEM FOR DRIVING ACCESSORY MACHINES OF A DOUBLE-BODIED TURBINE ENGINE

(75) Inventors: Hugues Henri Raymond Linet, Asnieres sur Seine (FR); Cyril Franck Mouchnino, Paris (FR); Serge Dominique Pettinotti, Courbevoie (FR)

(73) Assignee: Hispano-Suiza, Colombes (FR)

( * ) Notice: Subject to any disclaimer, the term of this patent is extended or adjusted under 35 U.S.C. 154(b) by 644 days.

(21) Appl. No.: 11/608,528

(22) Filed: Dec. 8, 2006

(65) Prior Publication Data
US 2007/0130959 A1 Jun. 14, 2007

(30) Foreign Application Priority Data
Dec. 9, 2005 (FR) .................................. 05 53816

(51) Int. Cl.
*F02C 7/32* (2006.01)
(52) U.S. Cl. .................................... 60/39.163; 60/802
(58) Field of Classification Search .............. 60/39.163, 60/788, 792, 802
See application file for complete search history.

(56) References Cited

U.S. PATENT DOCUMENTS

| | | | | |
|---|---|---|---|---|
| 3,100,378 A | * | 8/1963 | Austin et al. | ............... 60/791 |
| 3,514,945 A | * | 6/1970 | Austin | ............... 60/791 |
| 3,899,877 A | | 8/1975 | Flanigan et al. | |
| 4,912,921 A | | 4/1990 | Rice et al. | |
| 5,694,765 A | | 12/1997 | Hield et al. | |
| 6,142,418 A | | 11/2000 | Weber et al. | |

FOREIGN PATENT DOCUMENTS

| | | |
|---|---|---|
| DE | 1 476 454 | 12/1969 |
| EP | 0 798 454 A2 | 10/1997 |
| FR | 2 491 135 | 4/1982 |

OTHER PUBLICATIONS

U.S. Appl. No. 11/551,455, filed Oct. 20, 2006, Linet, et al.
U.S. Appl. No. 11/551,494, filed Oct. 20, 2006, Linet, et al.

* cited by examiner

*Primary Examiner*—Louis J Casaregola
(74) *Attorney, Agent, or Firm*—Oblon, Spivak, McClelland, Maier & Neustadt, L.L.P.

(57) ABSTRACT

A system for driving first and second accessory machines of a double-bodied turbine engine with an LP shaft and an HP shaft is disclosed. The system includes a first power train disposed between the shaft of the HP rotor and the first machines, which mechanically drives the first machines, and a first coupling means and a second power train between the shaft of the LP rotor and the second machines arranged so as to drive the said second machines. The system also includes a second coupling means between the first power train and the second power train allowing the second accessory machines to be driven by the shaft of the HP rotor, particularly when the engine operates at high speeds. The system may include a gearbox with at least two speed ratios and the first coupling means may be arranged to selectively couple one or other of the two ratios or else to decouple the mechanical transmission from the shaft of the LP rotor.

7 Claims, 2 Drawing Sheets

SYSTEM FOR DRIVING ACCESSORY MACHINES OF A DOUBLE-BODIED TURBINE ENGINE

The present invention relates to the field of multi-bodied gas turbine engines applied in aviation, and is aimed at a means of offtaking mechanical power from the rotor shafts. The particular object of this means is the driving of the accessory machines.

A turbine engine usually comprises an air compressor unit at least partially supplying a combustion chamber. The gases from the latter drive one or more turbine stages mechanically connected to the compressors and supply at least a portion of the thrust. A double-bodied engine comprises two sets of rotors, having concentric shafts and rotating mechanically freely relative to one another. There is the low pressure, LP, body, and the high pressure, HP, body. Civil aviation turbojets or turboprops comprise a fan or propeller rotor driven by the LP body and delivering a large part of the engine thrust.

A part of the power supplied by the engine is used to supply the accessory machines both of the engine itself and of the aircraft for which it provides the propulsion.

This power is currently taken off, partly mechanically, from the shaft of the HP stage of the engine to drive a power input shaft of a gearbox from which the accessories are driven. This gearbox is also called the AGB, for Accessory GearBox. In a turbojet with front fan, this gearbox is placed on the casing of the latter. Its power input shaft is usually driven by a transmission shaft housed in one of the structural arms of the intermediate casing, and connected via an angle transmission gearbox to a movement offtake bevel gear fixedly attached to the HP shaft. Various accessory machines, such as generators and hydraulic oil or fuel pumps are installed and driven on this gearbox. Another part of the energy offtake consists of pressurized air, bled off from the HP compressor, to provide in particular the pressurization and air conditioning of the aircraft cabin or else the de-icing.

The current trend aims to increase the proportion of the mechanical power offtake due to the increasing proportion of the electrical means considered more versatile to use. This increasing demand for electrical supply for the aircraft equipment makes it no longer possible, for reasons of engine operation and performance, mainly at low rotation speeds, to offtake the power from the HP body only.

This increased power offtake for the new applications of turbine engines therefore requires the application of a system for offtaking mechanical power from the HP and LP bodies. The subject of the invention is a means of offtaking power from the two rotors, this power being able, depending on the speed, to be offtaken from one or other of the two rotors or else from both simultaneously.

However, the HP and LP bodies rotate independently at different speeds and have different operating ranges. Between the idling speed and the full gas speed, the speed ratio for the HP shaft is of the order of two; the rotation speed increases, for example, from 10 000 revolutions per minute to 20 000 revolutions per minute. On the other hand, the ratio of speeds for the LP shaft is of the order of five; its speed increases, for example, from 900 revolutions per minute at idling to 4500 revolutions per minute at full gas speed. There is therefore the problem of providing an offtake compatible with these two distinct operating ranges. This problem is all the more important to resolve since the accessories installed on the gearbox are adapted to operate within speed ranges compatible with that of the HP body. It has been observed that it was markedly less than that of the LP body.

Therefore the subject of the present invention is also a combined means of offtaking mechanical power from the HP and LP bodies while supplying the AGB with an operating range that is compatible with the operation of the equipment or accessories mounted on the AGB gearbox.

To achieve these objectives, the invention distinguishes between first and second accessory machines, and the system for driving the said machines is characterized in that it comprises a first power train between the shaft of the HP rotor and the first machines arranged so as to mechanically drive the latter; it also comprises a first coupling means and a second power train between the shaft of the LP rotor and the second machines arranged so as to drive the said second machines.

The system also comprises a second coupling means between the first power train and the second power train allowing the second accessory machines to be driven by the HP rotor, particularly when the engine operates at a high speed and more particularly at full speed.

Advantageously, the first coupling means is arranged to be decoupled when the second coupling means is coupled.

Thus, thanks to the coupling means, the power offtake can be simply distributed between the two rotors depending on the engine speed.

Preferably the system comprises a gearbox with at least two speed ratios being connected at the input to the LP rotor shaft and at the output to the second power train, the first coupling means being arranged to selectively couple one or other of the two ratios or else to decouple the mechanical transmission from the LP rotor.

More particularly, the coupling means is arranged so that the change of ratios under load takes place without interruption in the transmission of torque. Again preferably, the first coupling means is a double coupling element transmission, known per se. The speed is changed only by operation of the coupling elements; the next ratio is necessarily available.

The drive system comprises a control means comprising as input parameters speed signals of the two LP and HP bodies and as output parameters control signals of the two coupling means.

The invention also relates to the operating mode of the system, whereby, at low engine speed, the first ratio of the gearbox is coupled, then the second ratio is coupled at a higher speed. Preferably, the second coupling means is decoupled when the first coupling means is coupled, and, at high speeds, particularly at full speed, the second coupling means is coupled and the first coupling means is decoupled.

On start-up, one or other or the two first or second machines comprising a means of starting the engine, the first coupling elements is decoupled and the second coupling elements is coupled, thus driving the HP rotor.

The coupling elements responds to the start-up stress and also the use of a third ratio thus makes it possible to optimize the system.

Other features and advantages of the invention will emerge from the following description of a non-limiting embodiment with reference to the appended drawings in which.

Figure 1:
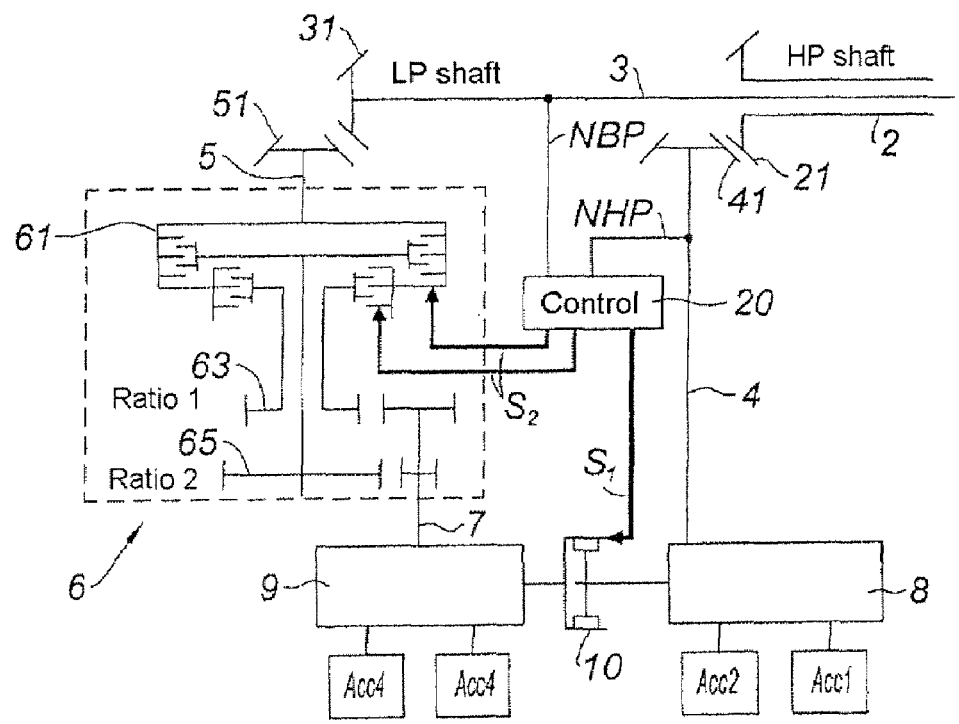
FIG. 1 is a schematic representation of a system for driving accessory machines according to the invention.

The elements represented in FIG. 1 are schematic. They are functional elements without including real details on their actual structure. It behoves those skilled in the art to associate therewith means belonging to the prior art.

Of the turbine engine, all that is kept in the figure is the shaft 2 of the HP rotor and the shaft 3 of the LP rotor. The two shafts are concentric and rotate freely relative to one another.

The other parts of the engine are not involved in the invention and may be of any type. Each shaft is fixedly attached to a bevel gear, 21 and 31. The gear 21 drives a transmission shaft 4 via a bevel gear 41.

The shaft 4 drives, via a first power train 8, first accessory machines, here two, A1 and A2. This power train is a fixed gear train such as an AGB.

The shaft 3 of the LP rotor drives a shaft 5 via the bevel gear 51. This shaft 5 forms the input shaft of a gearbox 6. The output shaft 7 of the gearbox drives second accessory machines A3, A4 via a second power train 9 that is preferably also a fixed gear train.

The gearbox 6, according to this embodiment, has two ratios, 63 and 65, connected to the input shaft 5 via a first coupling means 61, here a double coupling element. The number of ratios may however be higher.

A second coupling means 10 connects the power train 8 to the train 9. It may be a single coupling element as known per se, of a hydraulic coupler, of a free wheel or other.

A control unit 20 receives signals Nhp and Nbp representative of the rotation speeds of the respective rotors, and, in application of its incorporated program, sends an appropriate control signal to the members for actuating the first and second coupling means 61 or 10.

The operating mode of the drive system will now be described.

Figure 2:
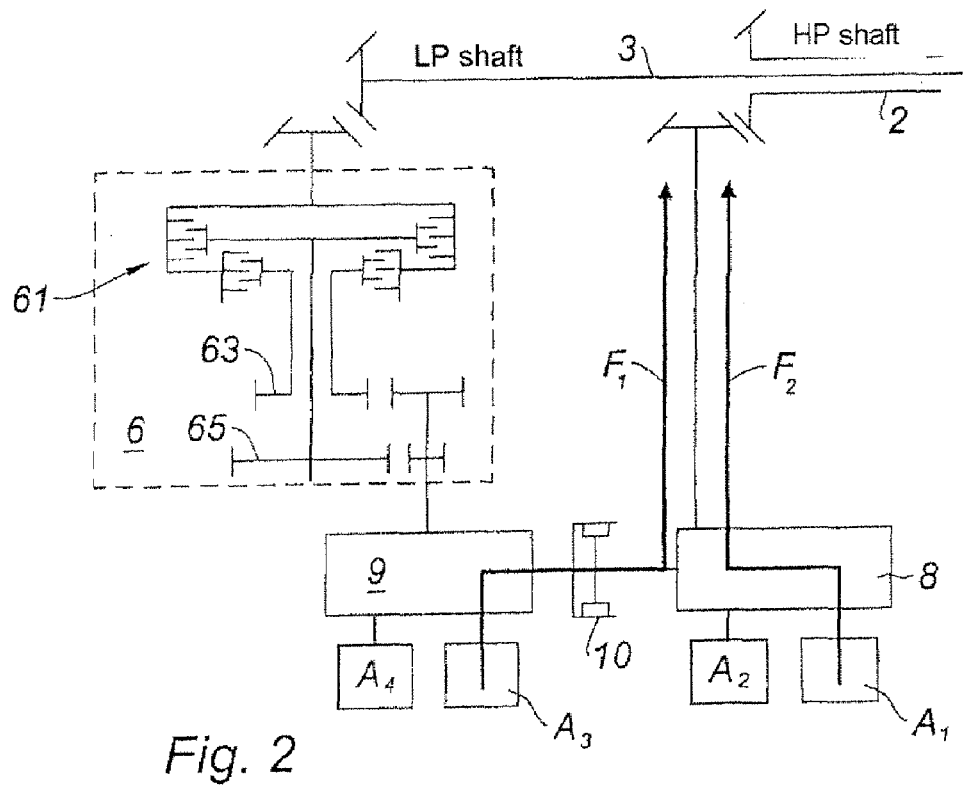
FIG. 2 illustrates the operation of the system on start-up.

In start-up mode, all the power of the start-up means is supplied to the HP body of the engine. For this purpose, the first coupling means 61 is decoupled and the second 10 is coupled. The two power trains are connected. The arrows F1 and F2 of FIG. 2 illustrate the transmission of power from the start-up means between the first and second machines. Thus, irrespective of the position of the accessories used for start-up, the start-up power is supplied in its entirety to the HP body.

In multi-bodied offtake mode, corresponding to the low engine speeds, the gearbox with two speed ratios makes it possible to make the speed range of the LP rotor compatible with those of the accessories installed on the second power train.

Figure 3:
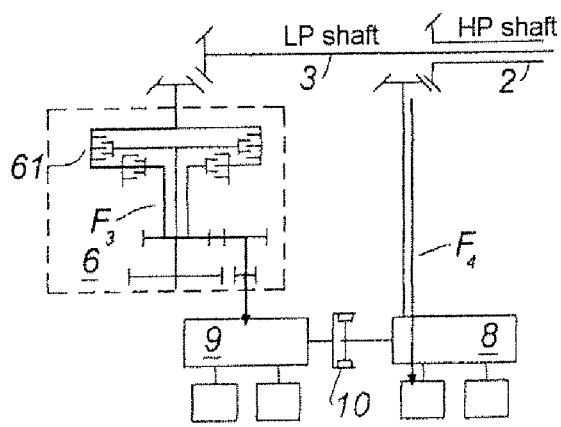
FIGS. 3 and 4 illustrate the multi-bodied operation of the system for each of the two ratios of the gearbox.

In a first engine speed range, the control 20 allocates to the first coupling means 61 to couple the first ratio 63 to the shaft 5. In FIG. 3, the arrow F3 illustrates the transmission of the power from the shaft 3 of the LP rotor to the power train 9 to drive the second accessory machines.

The arrow F4 shows the first train 8 driven by the HP shaft. The second coupling means 10 is decoupled.

Figure 4:
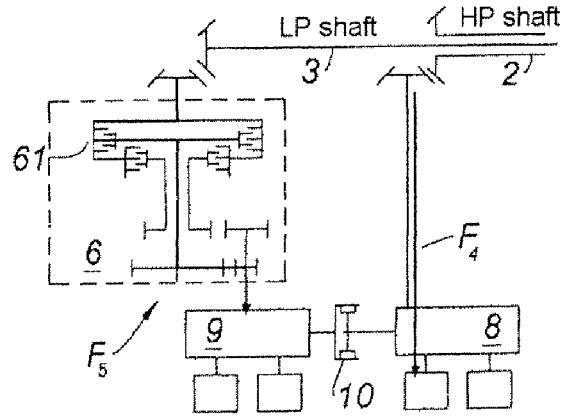

FIG. 4 illustrates via the arrows F5 and F4, the latter being unchanged, the transmission of power between the rotors and the machines at a higher engine speed. The second ratio 65 of the gearbox 6 is used. The second coupling means 10 remains decoupled. The gearbox with two ratios makes it possible to have the second ratio always available and to be able to couple it by simple control of the double coupling element without change of gear.

Figure 5:
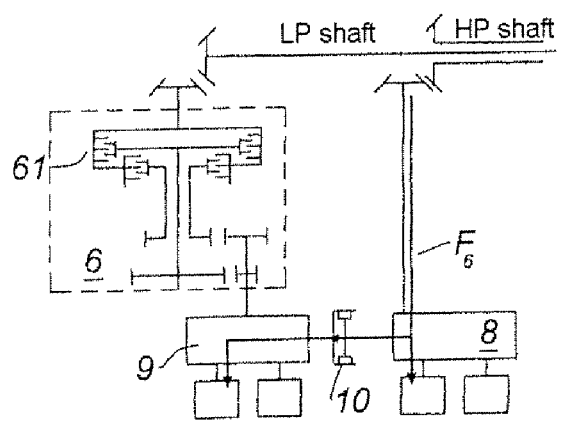
FIG. 5 illustrates the operation of the system in single-bodied offtake.

In single-bodied offtake mode corresponding to the field of high speeds, the first coupling means 61 is decoupled interrupting the connection of the system with the LP body. The coupling of the second coupling means 10 connects the power trains 8 and 9. All the power of the accessories is offtaken from the HP body. This is illustrated in FIG. 5 by the double arrow F6.

Figure 6:
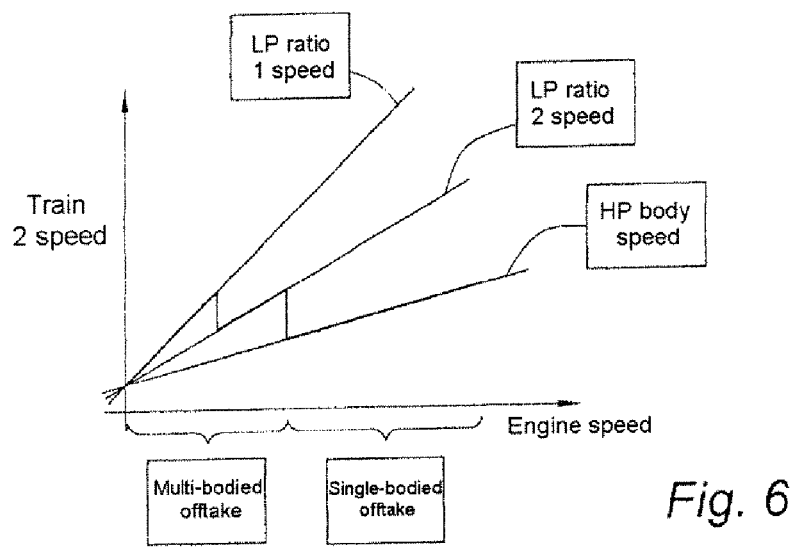
FIG. 6 represents the change of speed of the second power train depending on the engine speed.

FIG. 6 is a diagram illustrating the evolution of the rotation speed of the second machines on the power train 9, according to the engine speed.

The speed increases with the first gearbox ratio 63, then, at a given speed, the second ratio 65 is coupled; the speed increases according to this new law. Finally the coupling element 61 is decoupled while the second coupling element is coupled; the speed of the accessories then follows the law of the HP body.

It should be noted that, with an appropriate control law, the transition from one ratio to the other occurs without power transmission being interrupted.

The system of the invention therefore makes it possible to supply means for driving the two power trains that are compatible with the engine and aircraft equipment:
 transmitting the power from the LP body to the accessories;
 providing for the engine start-up by supplying power to the HP body only.

The invention claimed is:

1. A system for driving first and second accessory machines of a double-bodied turbine engine with a shaft of the low pressure LP rotor and a shaft of the high pressure HP rotor, comprising:
 a first power train disposed between the shaft of the HP rotor and the first accessory machines, which mechanically drives the first accessory machines;
 a first coupling means disposed between the shaft of the LP rotor and a second power train;
 the second power train disposed between the first coupling means and the second accessory machines, which drives the second machines;
 a second coupling means disposed between the first power train and the second power train which allows the second accessory machines to be driven by the shaft of the HP rotor when the engine operates at high speeds; and
 control means configured to selectively couple the first coupling means and the second coupling means based on speed signals of the shaft of the LP rotor and the shaft of the HP rotor,
 wherein the second accessory machines are driven by the shaft of the LP rotor when the first coupling means is coupled.

2. The system according to claim 1, wherein the control means is configured to decouple the first coupling means when the second coupling means is coupled.

3. The system according to claim 1, comprising a gearbox with at least a first and second speed ratios, an input of the gearbox being connected to the shaft of the LP rotor and an output of the gearbox being connected to the second power train,
 wherein the control means is configured to selectively couple the first coupling means to the first or second speed ratio or decouple the first coupling means.

4. The system according to claim 3, wherein the control means is configured to couple the first coupling means at the first speed ratio at a first speed of the turbine engine and is configured to couple the first coupling means at the second speed ratio at a second speed of the turbine engine, and
 wherein the second speed is greater than the first speed.

5. The system according to claim 1, wherein the control means is configured to decouple the second coupling means when the first coupling means is coupled.

6. The system according to claim 5, wherein the control means is configured to couple the second coupling means and decouple the first coupling means at high speed of the turbine engine.

7. The system according to claim 1, wherein one of the first or second accessory machines comprises a means for starting the engine, and the control means is configured to decouple the first coupling means and couple the second coupling means at start-up of the turbine engine.

* * * * *